Inventor
Vahan B. Nigoghosian

Patented Mar. 28, 1950

2,502,230

UNITED STATES PATENT OFFICE 2,502,230

HORSE AND WAGON TOY

Vahan B. Nigoghosian, Philadelphia, Pa.

Application January 22, 1946, Serial No. 642,621

5 Claims. (Cl. 46—102)

My invention relates to toys in which a wagon or cart is drawn along a floor and the movement of the wheels causes corresponding movement of the legs of a horse supported in the wagon shafts.

A purpose of the invention is to simplify the construction both in manufacture and in operation.

A further purpose is to operate the front legs of the horse from the rear wheels of the wagon and the rear legs of the horse from the front wheels of the wagon, thus avoiding conflict between the connections for the one pair and the connections for the other pair.

Further purposes will appear in the specification and in the claims.

In the drawings similar numerals indicate like parts.

Figure 1:
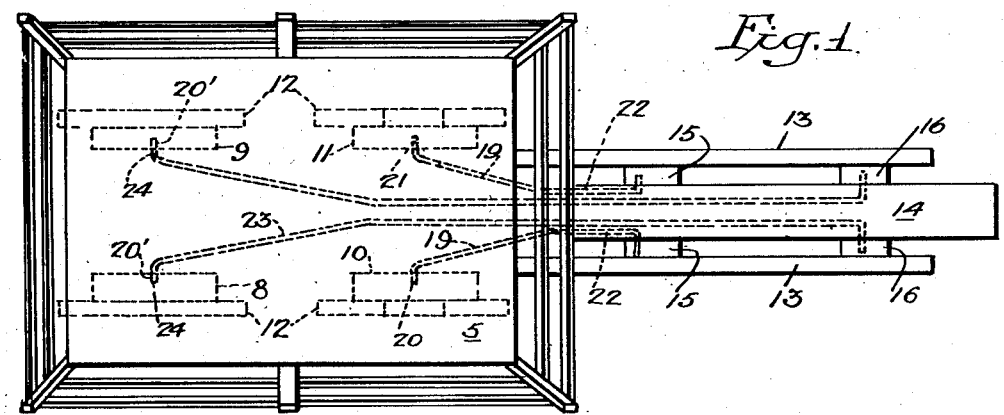
Figure 1 is a top plan view of an equipment showing my invention.
Figure 2:
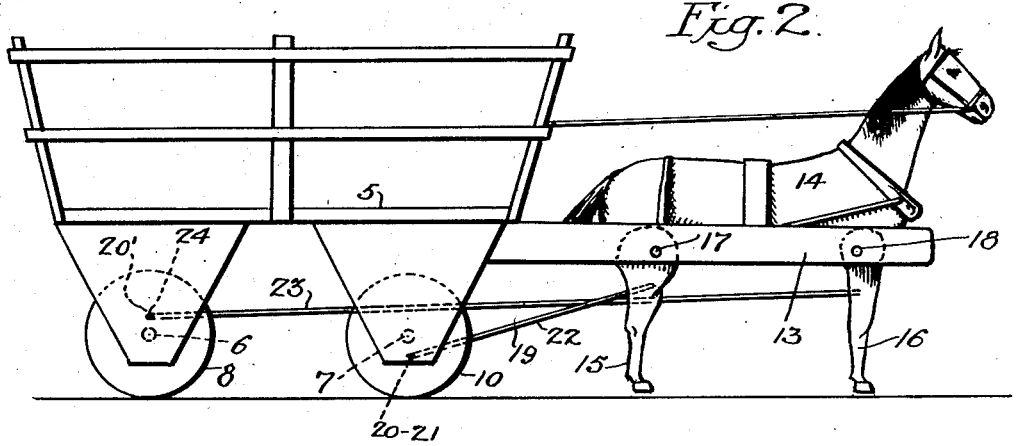
Figure 2 is a side elevation of the horse and wagon seen in Figure 1.

Any suitable wagon or cart 5 is mounted through separate pins 6 and 7 upon rear wheels 8 and 9 and front wheels 10 and 11. The pins are inserted from the inside outwardly and pass through the wheels into the side brackets 12. The pins thus have no axle extensions across from wheel to wheel of the pair to interfere with cranks connected with the inner faces of the wheels.

From the cart project shafts 13, between which a horse 14 is supported, the distribution of weight being such that the horse is lifted bodily above the floor, with the effect of leaving the horse's legs 15 and 16 normally free to swing forward and back upon their pivotal pins or rods 17 and 18, without the horse's hoofs striking the floor. The body of the horse is supported from the shafts, permissibly by the same pins or rods 17, 18 as pivot the legs.

The rear legs 15 are connected below the respective leg pivots by rods 19 with off-center openings 20 in the interiors 21 of the front wheels so as to make these connections effective as cranks. For this purpose the rods are turned at their rear ends toward the wheels and enter the wheels.

The rods at their front ends are connected with the legs at such a distance below the leg pivots that for each turn of the front wheels the corresponding rear legs have an appropriate length of movement, corresponding with the normal amount of movement of the horse's leg. Though the connection with the horse's leg is made from the interior of the horse's leg outwardly because by this means the connecting rods are less in evidence than they would be if rods were connected with the legs from the outside, it makes little difference mechanically whether the connection of the forward ends 22 of the rods 19 to the legs of the horse be from the inside outwardly or from the outside inwardly.

The connections from the rear wheels to the forward legs of the horse are generally similar to those of the front wheels to the rear legs of the horse. They are made by the rods 23 whose crank ends 24 turn outwardly to enter openings 20' within the inside faces of the rear wheels so as to be effective as cranks. They connect with the front legs of the horse at such distances below the leg pivots that a swinging motion is provided corresponding generally with the expected extent and timing of the front legs in normal trotting, galloping or running of the horse. The timing of the movement is determined by the coincident setting of the wheels of the wagon to correspond in leg position and subsequent directions of leg movements with the gait intended.

Figure 3:
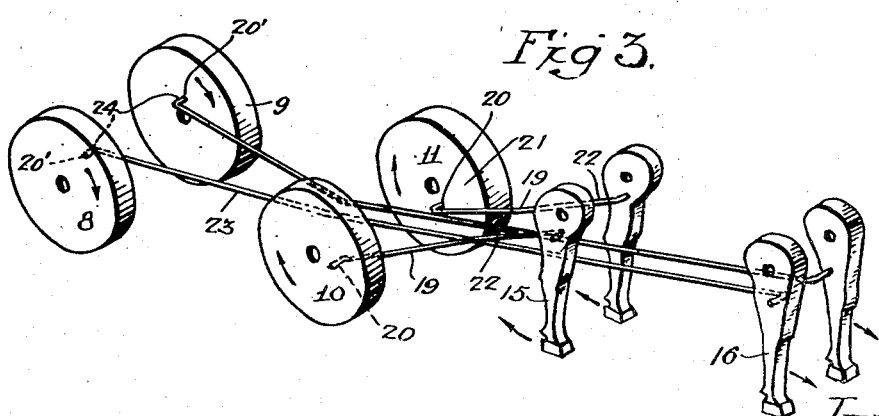
Figure 3 is a skeletonized view of the crank rods by which the horse's legs are operated and the legs.

If the wheels be located so that the crank throws of the rods 22 both be in corresponding position at the same time, as in the case in Figure 3, both the rear legs will move together. The front legs can also be set to move together and in proper timing with respect to the rear legs so that the horse may be made to appear to gallop; whereas with different positions with the right and left cranks with respect to each other for different pairs of legs, may be made to give the appearance of trotting or running.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention, what I claim as new and desire to secure by Letters Patent is:

1. In a horse and wagon toy, a wagon having depending side supports at opposite sides, a pair of rigid shafts secured to the wagon, a horse supported from the shafts to clear the ground, wheels upon the insides of the supports, pins extending from the inside to the outside of and outwardly engaging the supports to form axles for the wheels leaving each wheel independent of each other pivots in the legs of the horse permitting the legs to swing forward and backward independently, and rods independently connecting each leg and wheel connected off center to a leg at one end of each rod and off center with respect to the pins at the other end in openings through the inside faces of the wheels.

2. In a horse and wagon toy, a wagon having depending side supports at opposite sides, a pair of rigid shafts secured to the wagon, a horse supported from the shafts to clear the ground, wheels upon the insides of the supports, pins extending from the inside outwardly as stub axles for the wheels leaving each wheel independent of each other, pivots in the legs of the horse permitting the legs to swing forwardly and backwardly independently, and rods independently connecting each leg and wheel connected off pivotal center to a leg at one end of each rod and off center with respect to the stub axle of a wheel in openings at the insides of the wheels, the rods connecting each front wheel independently with one rear leg and each rear wheel independently with the one front leg.

3. In a horse and wagon toy, a wagon having depending side supports at opposite sides, a pair of rigid shafts secured to the wagon and a horse supported from the shafts to clear the ground, wheels upon the insides of the supports, pins forming stub shafts for the wheels extending from the inside outwardly leaving each wheel independent of each other, pivots in the legs of the horse permitting the legs to swing forwardly and backwardly independently and rods connected each to a leg at one end of each rod, off center with respect to the pivot of the leg and in openings at the insides of the wheels off center with respect to the wheel pins, the rods connecting each front wheel with one rear leg and each rear wheel with one front leg, and the rods from the rear wheels being closer together laterally where they pass the front wheels and rear legs than are the rods extending from the front wheels.

4. In a horse and wagon toy of the type in which the horse is supported from the wagon and the legs of the horse are swung by reason of rotation of the wheels of the wagon, front and rear wheels, separate stub shafts for each wheel, pivots for the legs, crank rods each joining an off center point on the inside of one of the front wheels with off-pivot points on one rear leg, crank rods each joining an inside rear wheel off center point with a point on one of the front legs at a distance from the front leg pivots, the second set of rods being closer together where they pass the first set than the distance between the rods of the first set.

5. In a horse and wagon type of toy in which the horse is supported by the shafts of the wagon and the wheels of the wagon operate the legs of the horse, wheel-supporting brackets connected with the body of the wagon, front and rear pairs of wheels adjoining the brackets, separate pivot pins for each wheel extending from the inside of each wheel into and supported within the brackets, front and rear legs for the horse pivoted in the shafts and connections between each front wheel and one rear leg of the horse and between each rear wheel and one front leg of the horse adapted to swing the legs by crank action of the wheels, the connections between the front wheels and the rear legs lying nearer the outsides of the units than the connections between the rear wheels and the front legs of the horse.

VAHAN B. NIGOGHOSIAN.

REFERENCES CITED

The following references are of record in the file of this patent:

UNITED STATES PATENTS

| Number | Name | Date |
| --- | --- | --- |
| 131,128 | Stephens et al. | Sept. 3, 1872 |
| 328,912 | Hall | Oct. 20, 1885 |
| 1,927,861 | Wypy | Sept. 26, 1933 |
| 2,382,186 | Valenti | Aug. 14, 1945 |